United States Patent [19]

Sanders

[11] Patent Number: 5,491,922
[45] Date of Patent: Feb. 20, 1996

[54] REMOTE CONTROL FLOATATION BOOM

[76] Inventor: Bruce C. Sanders, 838 W. 3900 South, Ogden, Utah 84405

[21] Appl. No.: 333,630

[22] Filed: Nov. 3, 1994

[51] Int. Cl.$^6$ .................................................. A01K 79/00
[52] U.S. Cl. ............................ 43/6.5; 210/242.1; 405/63; 405/71
[58] Field of Search ........................... 43/6.5; 210/242.1, 210/242.3, 776, 923; 56/8, 9; 405/63, 66, 70, 71; 119/205, 213

[56] References Cited

U.S. PATENT DOCUMENTS

| | | | |
|---|---|---|---|
| 3,768,193 | 10/1973 | London | 43/6.5 |
| 4,051,038 | 9/1977 | in'tVeld | 210/242 S |
| 4,073,143 | 2/1978 | Preus | 210/923 X |
| 4,116,007 | 9/1978 | Stagemeyer et al. | 210/923 X |
| 4,146,477 | 3/1979 | Challenger | 210/776 X |
| 4,208,287 | 6/1980 | Brieck | 210/242 S |
| 4,340,321 | 7/1982 | Maheshwary et al. | 405/66 |
| 4,388,188 | 6/1983 | Morris | 210/923 X |
| 4,839,062 | 6/1989 | Sanders | 210/776 |
| 4,998,369 | 3/1991 | Lamon | 43/6.5 |
| 5,002,430 | 3/1991 | Smith | 210/776 X |
| 5,042,187 | 8/1991 | Bentzley | 43/6.5 |
| 5,102,540 | 4/1992 | Conradi et al. | 210/242.3 X |
| 5,160,432 | 11/1992 | Gattuso | 210/242.3 |
| 5,253,953 | 10/1993 | Whidden, Jr. | 405/63 |

FOREIGN PATENT DOCUMENTS 695641  8/1953  United Kingdom ..................... 43/6.5

Primary Examiner—P. Austin Bradley
Assistant Examiner—Jeanne M. Elpel

[57] ABSTRACT

A floatable boom for concentrating brine shrimp eggs which are floating at or near the surface of a body of water. The floatable boom comprises a rigid, floatable tube, a skirt affixed to the lower portion of the tube and extending downward into the body of water, and a remotely controlled drive device for propelling the floatable boom through the body of water. The invention discloses two of the novel, floatable booms extending outwardly from a harvesting boat in a divergent manner, such that a wedge-shaped concentrating angle is formed between the booms. The invention further comprises a means of support for maintaining the wedge-shaped concentrating angle formed by the booms.

34 Claims, 7 Drawing Sheets

REMOTE CONTROL FLOATATION BOOM

BACKGROUND

1. Field of the Invention

The present invention relates generally to an apparatus for concentrating substances or materials which are floating at or near the surface of a body of water. More specifically, the present invention is directed to a floatable boom for concentrating brine shrimp eggs which are floating at or near the surface of a body of water.

2. Technology Review

For many years, brine shrimp and their eggs have been harvested from salt water bodies and used as a commercial source of fish food. The eggs of this small crustacean are capable of withstanding drying conditions over extended periods of time. In fact, eggs which were harvested and packed several years ago can be hatched, and young brine shrimp raised, when the eggs are returned to salt water. This tremendous capacity of the eggs to withstand drying conditions makes them an ideal source of commercial fish food.

Brine shrimp and their eggs are typically found in colonies which form thin, floating layers on the surface of bodies of water. The eggs are extremely small in size such that several million eggs may be present in a single ounce of water. The brine shrimp and eggs tend to conglomerate, forming a floating layer occupying the top one quarter inch of water. This floating layer is carried by the tide and the wind, eventually being deposited on the shoreline.

Conventional approaches to harvesting brine shrimp eggs often focused on collecting the eggs once they had been deposited on the shoreline. With the use of hand-held nets or shovels, the thin layer of shrimp eggs could be scooped up and placed into storage containers. This approach was far from effective, however, as the harvester was at the whim of the wind and the tide as far as where, and when, the eggs would be deposited along the shoreline.

To deal with these problems of unpredictability, elaborate fencing structures were erected, extending outwardly from the shoreline, to direct incoming shrimp colonies to preselected harvesting sites on the beach. While noticeably more effective in concentrating colonies at predetermined sites, this method was not, however, without its disadvantages. As an initial problem, these extensive fencing structures are understandably expensive. Additionally, this method requires that the harvester have access to large areas of shoreline. Finally, the harvester is still, to a considerable extent, at the whim of the wind and the tide.

Because of the disadvantages inherent in shoreline harvesting methods, an increasing attention has been directed toward methods for harvesting brine shrimp eggs directly from the water. Such methods usually employ a boat or raft equipped with a harvesting device, and some type of boom system to channel the shrimp colonies to the harvesting device.

Various boom systems are disclosed in the prior art as a means for channeling shrimp colonies to the harvesting device. U.S. Pat. No. 3,768,193 by London discloses a wedge shaped collecting structure comprising a water skimming net having a base portion and opposite sidewalls. The net includes a wide, open front portion for skimming and collecting shrimp colonies, and a narrow back portion for funneling the colonies into a harvesting sluice.

U.S. Pat. No. 4,839,062 by Sanders also teaches a wedge shaped collecting structure. In Sanders, the wedge shaped structure is formed by two opposite side arms separated by a cross support. This channeling structure can be selectively raised and lowered by a height adjustment mechanism anchored to a boat.

U.S. Pat. No. 5,042,187 by Bentzley discloses a different method of channeling shrimp colonies to a harvesting device. In Bentzley, a floating boom is positioned to encircle a shrimp colony. A pair of motor driven rollers engage opposite ends of the boom and draw the boom therethrough, decreasing the perimeter of the boom's enclosure. The tightening of the boom's enclosure forces the circumscribed shrimp colony through a harvesting device located at an outlet port to the enclosure.

Certain disadvantages exist, however, with each of the aforementioned channeling systems. In London, a major problem is the short length of the side arms of the channeling structure. Because the entire wedge shaped structure is comprised of a fine net, and this net must be able to hold its configuration as it is skimmed through the water, there is a practical limit on the length of such a structure. The small length of the side arms makes the structure less effective in concentrating large amounts of shrimp eggs at one time. This problem of inefficiency is exacerbated when the device is used in shifting currents or winds.

A channeling device utilizing longer side arms is disclosed in Sanders, wherein a length of approximately 15 feet is contemplated. For practical reasons, however, lengths much greater than this would be prohibited by the height and weight required of the height adjusting mechanism, and, likewise, the size of the boat necessary to support such a mechanism.

In addition to the limitations on the length of the side arms, the Sanders device suffers from other disadvantages. Significantly is the fact that the individual side arms are difficult to adjust in a horizontal, or side-to-side, fashion. While the structure permits adjustment of the vertical height of the side arms so that the side arms may rest at the desired depth in the water, the structure is not easily adjusted in a horizontal fashion. This presents considerable problems to the harvester faced with shifting currents or shifting winds. In order to correct for the changing position of the shrimp colonies, the harvester must steer the entire boat so that the side arms are positioned most favorably.

Bentzley discloses an apparatus which enables the harvester to utilize a boom of a much greater size than what had previously been used, but this method is not without its own set of drawbacks. One major disadvantage of this type of system is that it requires repeated efforts to reposition the boom each time the boom is drawn in by the retrieval system. In order to reposition the boom to encircle another colony of floating shrimp eggs, a considerable amount of manpower and, most likely, at least one additional boat will be required. This results in a process that is both labor intensive as well as time consuming.

It will be appreciated, then, that it would be an advancement in the art if one could provide a boom that is longer than conventional straight booms and capable of being independently directed to a shifting target of floating shrimp eggs. It would be a further improvement if the boom could be directed in a simple, convenient manner that did not require either steering the entire boat in a particular manner or removing the boom from the water and replacing it. It would be a still further improvement if such a boom could be controlled remotely.

SUMMARY OF THE INVENTION

The present invention discloses a novel floatable boom for use in concentrating a thin layer of brine shrimp eggs at the surface of a body of water for the purpose of harvesting the eggs. In a preferred embodiment of the present invention, two of the novel booms are used together, with each boom extending outwardly from a harvesting boat in a divergent manner. The booms form a wedge-shaped, concentrating angle wherein there is a wide, forward end and a narrow, rearward end for funneling the brine shrimp eggs into a harvesting device.

Each of the novel booms is preferably connected at one end to a brine shrimp harvesting boat and at its other end to a drive device. The drive device serves to propel the floatable boom through the body of water.

It will be appreciated by one skilled in the art that the floatable tube can be comprised of a variety of different elements. In its presently preferred embodiment, however, the tube is constructed of a rigid, floatable material. Suitable tubes may be prepared, for example, from aluminum pipe or polybutalene pipe filled with foam. This provides a tube which is sufficiently strong to function as a boom, yet light enough to remain floatable.

Affixed to the lower portion of each floatable tube, and extending essentially the entire length of the tube, is a skirt, or curtain, of a material impermeable to brine shrimp eggs. The skirt preferably extends downward from the lower portion of the tube to a depth of about 4 to 18 inches beneath the water's surface. The skirt could extend even deeper than 18 inches, but a deeper skirt would make it more difficult to control movement of the floatable boom. The skirt functions to prevent brine shrimp eggs from passing beneath the tube. In this manner, the skirt helps to further concentrate the thin layer of brine shrimp eggs floating at the surface of the water.

Although the skirt can be rigid or flexible in nature, it is presently preferred that the skirt be rigid to add to the overall rigidity of the floatable boom. Additionally, unlike conventional vertical skirts, it is preferred that the skirt extend generally downward in an angled fashion such that the lower portion of the skirt angles inward, towards the opposite floatable boom. This angled nature of the skirt further prevents the passage of eggs beneath the tube, thereby enhancing the concentrating effects of the wedge-shaped concentrating system.

At the far end of each floatable boom, or the end furthest from the harvesting boat, is attached a drive device for propelling the boom through the water. While this drive device may take a number of different forms without departing from the scope of the present invention, including conventional manned boats, it is presently preferred that the drive device comprise an unmanned, remotely controlled unit. In the presently preferred embodiment, the drive device comprises an outboard motor attached to a frame, at least one float attached to the frame, and means for operating the motor remotely.

There are several means for operating the drive device remotely which fall within the scope of the present invention. In one embodiment, the drive device is controlled through a series of control cables. The control cables, extending from the harvesting boat to the drive device, are contained within a conduit which is affixed to the upper portion of the floating tube. Fiber optic cables and electric cables are two examples of different types of control cables which may be used to control the drive device. Alternatively, the drive device may be controlled remotely by a means which does not utilize cables such as, for example, radio wave communication.

Remote control operation allows a harvester of brine shrimp eggs to control each of the floatable booms independently from a position remote from the drive devices. Such control, from the harvesting boat for example, allows the harvester to simply and effectively direct the floatable booms to a desired position on the water's surface. This allows for better adaptation to shifting colonies of brine shrimp eggs, driven by changing winds and currents, and provides a means for more efficiently concentrating the shrimp eggs than what has been known previously in the art.

In addition, because the floatable booms can be controlled remotely by a single worker, the present invention offers a method for harvesting brine shrimp eggs which requires less manpower than conventional methods. No longer will extra workers be required in order to reposition the booms each time the wind or current shifts. Further, the need for additional manned boats to reposition the booms is eliminated. Thus, the present invention offers significant cost saving potential over conventional methods.

The overall length of each of the floatable booms can be anywhere from about 20 feet up to about 200 feet, although it is presently preferred to employ booms with lengths of approximately 40 feet to 150 feet, and, more specifically, in the range of 80 feet to 135 feet. This provides a boom with a length that is significantly larger than what has previously been taught in the brine shrimp harvesting industry, and further enhances the concentrating effectiveness of the novel boom.

Boom lengths of greater than 200 feet are achievable by the present invention, but, due to practical considerations, boom lengths between 80 feet and 100 feet are presently preferred. As boom lengths become longer, problems related to maneuverability of the drive devices increase, as do problems related to energy efficiency. With increasing boom lengths come increasing costs for fuel, both to power the drive devices as well as to power the harvesting boat itself. In addition, longer boom lengths make transport and storage of the booms increasingly difficult. For these reasons, boom lengths in excess of 200 feet, although conceivable, are currently not preferred.

Boom lengths of 80 feet to 135 feet are preferably achieved by multiple sections of rigid tube and skirt connected together. In a currently preferred embodiment, the boom comprises three sections of tube and skirt, each section being approximately 40 feet to 50 feet in length, in which adjacent sections are slidably connected, end-to-end. The actual length of the individual sections may vary depending on the type and the source of tube.

The present invention optionally includes support means for maintaining the wedge-shaped, concentrating angle between two booms. Although this support means may include a variety of different structures, it is presently preferred to utilize a cable which is attached to the inner side of each opposing skirt. If necessary, two cables may be used. The first cable is located approximately midway along the length of the boom, near the connecting point of the individual boom sections. The second cable is located near the far end of the boom, near the drive device.

A number of alternative support means can be envisioned which do not depart from the spirit of the present invention. For example, a rigid bar or strut could be used for maintaining the concentrating angle between two booms. Alternatively, one could employ a rope or a chain as a different type of flexible support means. These support means are included within the scope of the present invention.

The advantages of this unique floatable boom are apparent when considering the existing technology in the brine shrimp egg harvesting industry. As an initial matter, the length of the rigid boom is significantly larger than conventional straight-arm booms. This increased length promotes increased efficiency in concentrating large numbers of brine shrimp eggs at a harvesting device.

Additionally, the boom's unique design, with the rigid skirt angled inward rather than vertically downward, offers further advantages over existing technology. This design helps to more efficiently concentrate large numbers of eggs at the surface, where they can be harvested.

Finally, the capacity of the individual booms to be controlled remotely offers tremendous advantages over conventional booms. Because brine shrimp colonies on the surface of bodies of water are subject to shifting winds and currents, their location is constantly changing. Unlike conventional booms, the present invention provides a means for efficiently adapting to shifting colonies of brine shrimp. A harvester on a harvesting boat can easily and effectively direct the floatable booms of the present invention to a new, more desirable position in response to a shifting current. In addition, this can be done in a manner which does not require the booms to be lifted from the body of water and replaced.

DETAILED DESCRIPTION OF THE INVENTION

Figure 1:
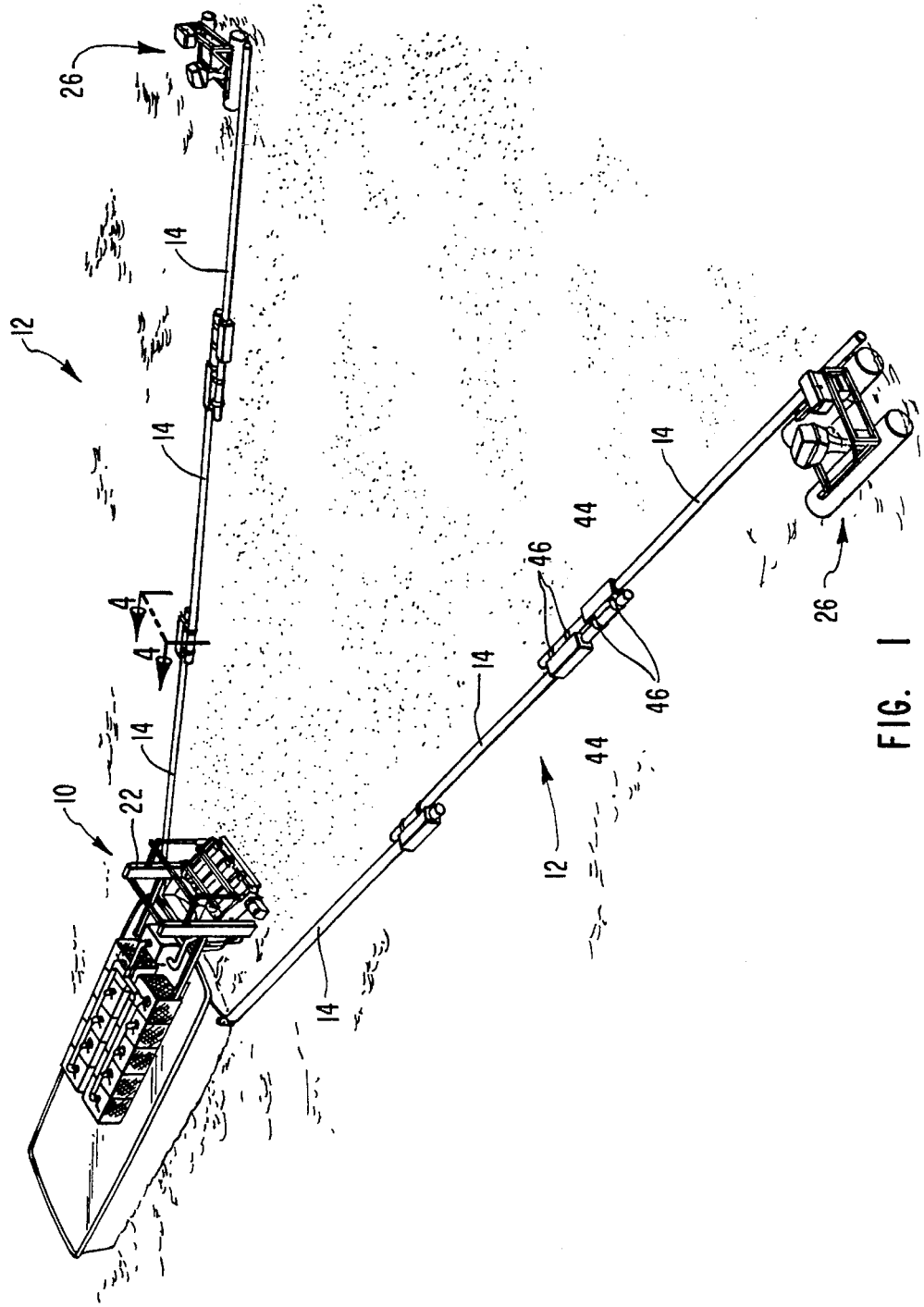
FIG. 1 is an elevated perspective view of fully deployed floatable booms in operation at a water surface.
Figure 2:
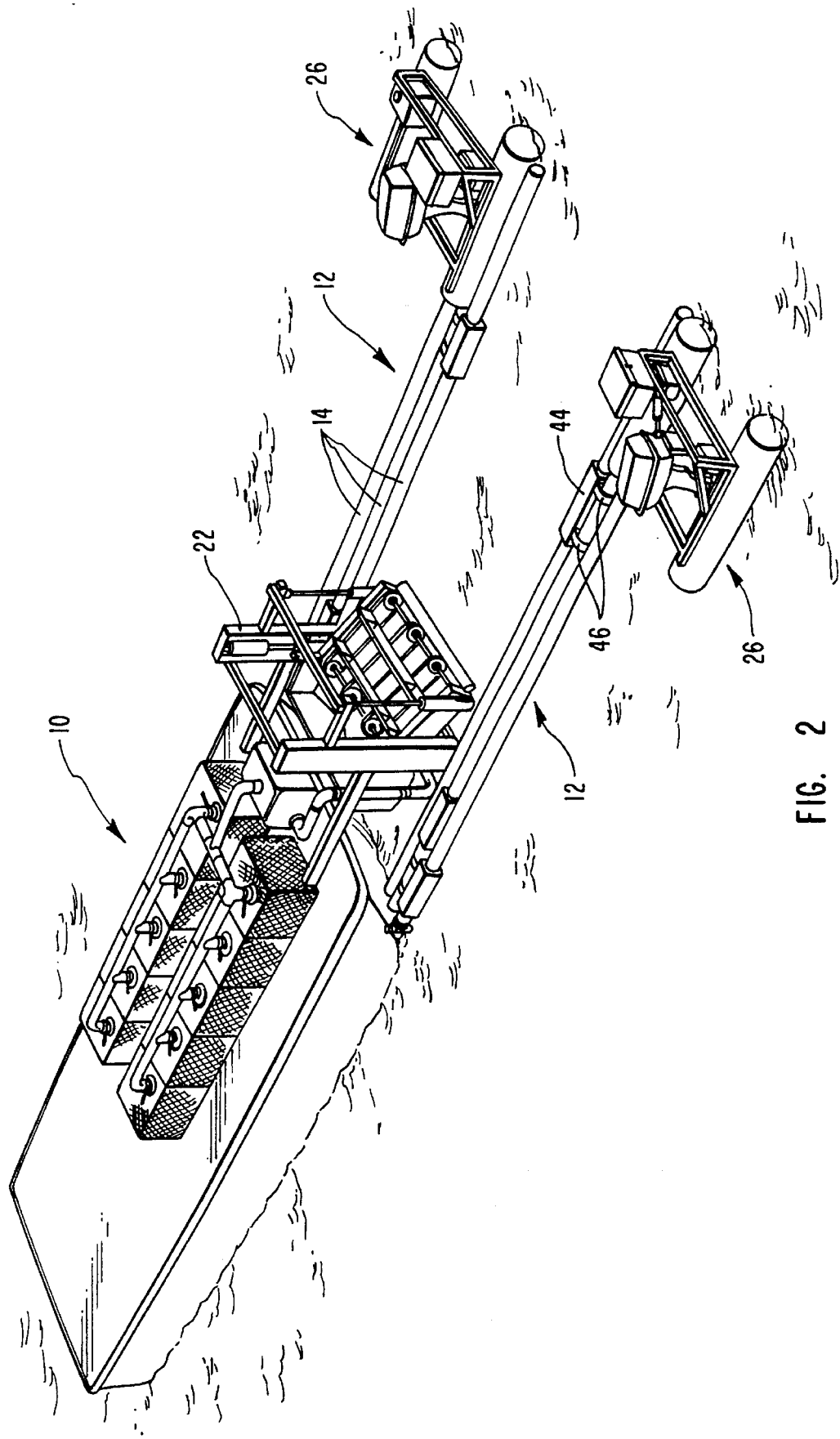
FIG. 2 is an elevated perspective view of the floatable booms of FIG. 1 in a retracted position.

Referring now to the drawings, and in particular to FIG. 1, a brine shrimp harvesting boat 10 is depicted utilizing two of the novel floatable booms 12 of the present invention. The floatable booms 12 preferably include a plurality of floatable tube sections 14. In operation, the floatable booms 12 form a wedge-shaped, concentrating angle with a wide, forward end 16 and a narrow, rearward end 18 for funneling brine shrimp eggs 20 into a harvesting device 22.

Each of the floatable booms 12 is attached at one end to the harvesting boat 10 as shown in FIG. 1. Alternatively, shown in FIG. 5, the floatable booms are attached to the harvesting boat 10 through the harvesting device 22. The opposite end of the floatable boom 12 is preferably attached to a drive device 26, which serves to propel the floatable boom 12 through a body of water. In the embodiment shown in FIG. 3, the tube section includes a threaded end cap 27 to assist in attaching the floatable booms 12 to the harvesting boat 10.

Figure 3:
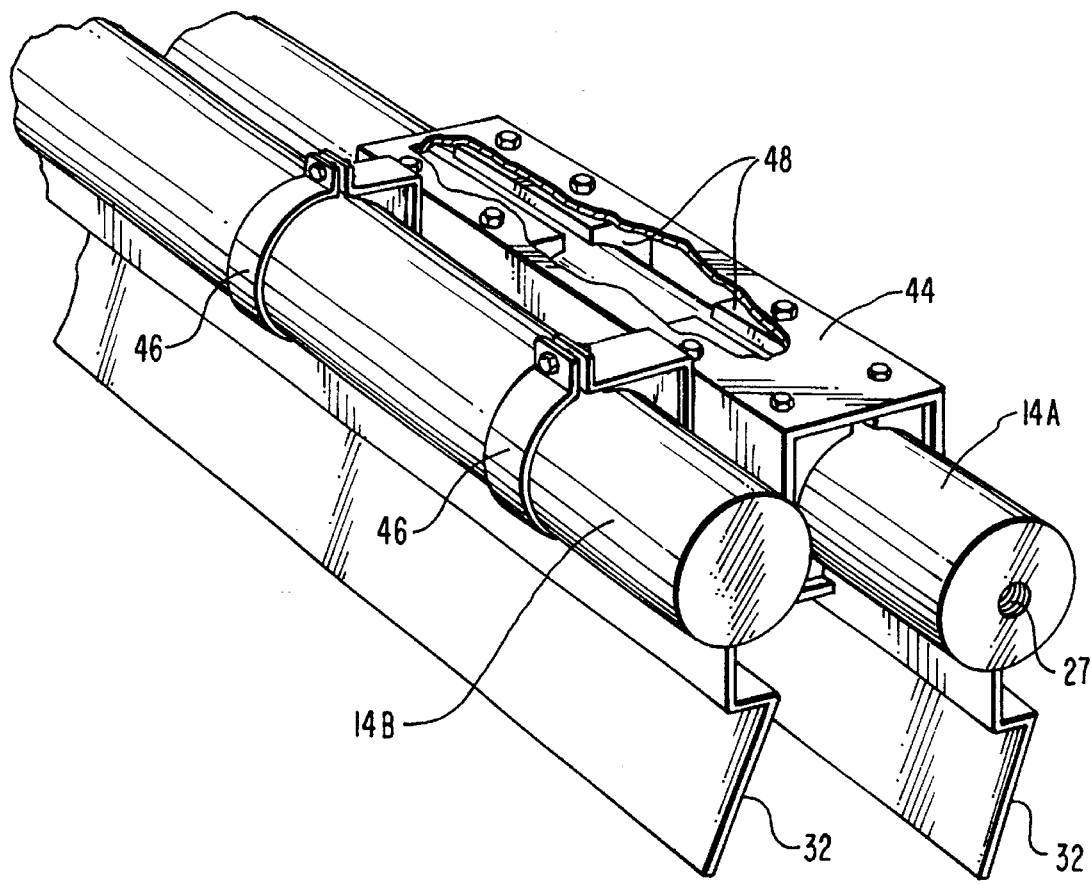
FIG. 3 is an enlarged perspective view of two adjacent floatable tube sections and the structure for permitting relative slidable movement of the tube sections.
Figure 6:
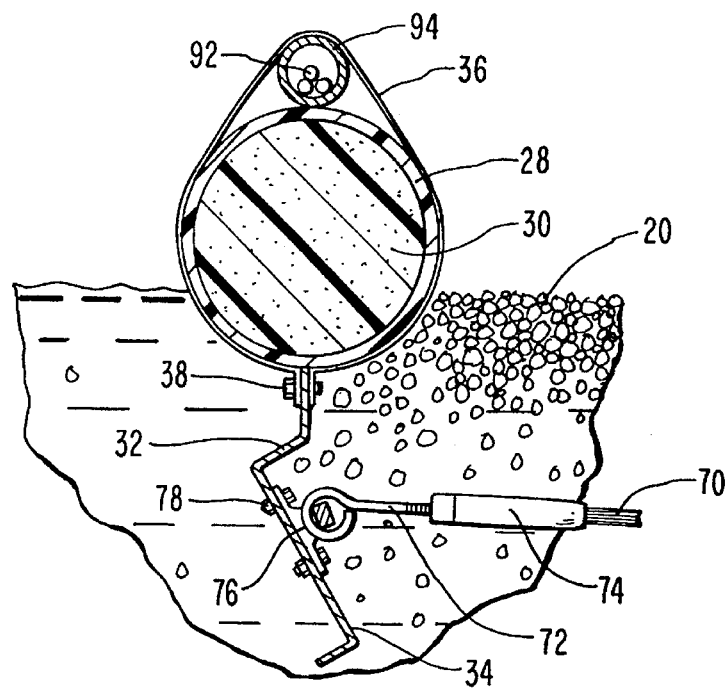
FIG. 6 is a cross-sectional view of the boom at the point of attachment of a support cable taken along line 6—6 of FIG. 5.
Figure 7:
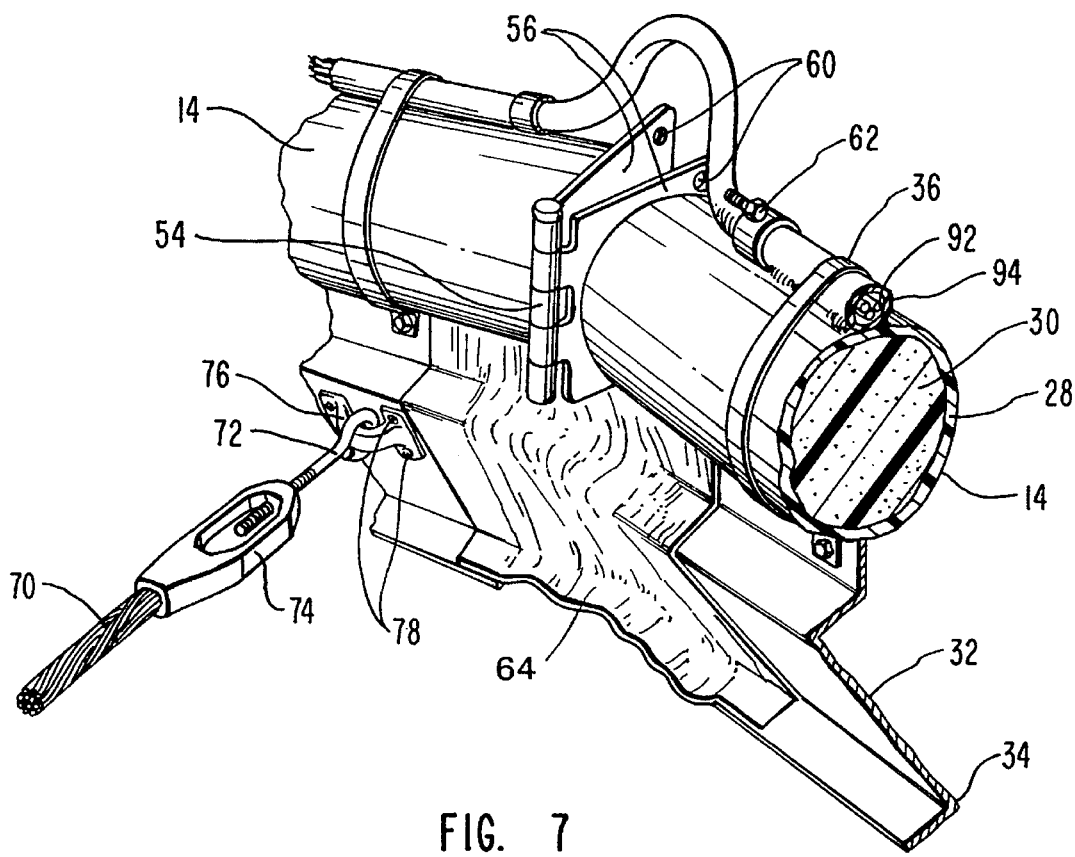
FIG. 7 is a cross-sectional perspective view of the hinge apparatus at the mid-section of the boom, taken along line 7—7 of FIG. 5.

The floatable tube section 14 is preferably comprised of a rigid, outer shell 28. As shown in FIG. 3, the tube section 14 is constructed from aluminum pipe with the ends sealed to render the tube section floatable. As shown in FIGS. 6 and 7, other materials may also be used to construct the tube section 14, such as plastic pipe filled with foam 30. Polybutalene pipe is a currently preferred plastic pipe material. This construction gives the tube section 14 rigidity, yet enables the tube section 14 to remain floatable. The tube section 14 is preferably constructed of aluminum pipe because of its light weight and high rigidity. The diameter of the tube section 14 may vary, although it is presently preferred, for practical considerations, that the diameter be in the range of from about 4 inches to about 12 inches.

Affixed to the lower portion of each floatable tube section 14, and extending essentially the entire length of the tube section 14, is a skirt 32. The skirt 32 is constructed of a material impermeable to brine shrimp eggs and preferably is rigid. One suitable material for construction of the skirt 32 is a metal, such as aluminum. The skirt 32 extends downward from the lower portion of the floatable tube section 14 to a depth of about 4 to 18 inches beneath the water's surface. Unlike traditional vertical skirts, it is preferred that the skirt 32 extend downward in an angled fashion such that the lower portion 34 of the skirt 32 angles inward, towards the opposite floatable boom 12. The angled nature of the skirt 32 helps prevent the passage of brine shrimp eggs 20 beneath the tube section 14, thus further enhancing the concentrating effects of the floatable boom 12.

Various methods can be employed to affix the skirt 32 to the lower portion of the floatable tube section 14. One method of affixation, shown in FIG. 4, which is preferably used if both the outer shell 28 of the tube section 14 and the skirt 32 are comprised of a metal, such as aluminum, is to weld the skirt 32 to the lower portion of the tube section 14. Another possible method of attachment, depicted in FIGS. 6 and 7, is to utilize a series of ring-shaped brackets 36 which encircle the tube section 14 and fasten to the skirt 32 by means of a fastening bolt 38.

The overall length of each of the floatable booms 12 can be anywhere from about 20 feet up to about 200 feet, although it is presently preferred to employ booms with lengths of approximately 40 feet to 150 feet, and more specifically, from about 80 feet to 135 feet. Shorter boom lengths can be achieved by single tube sections 14 and skirt 32, but higher boom lengths (greater than about 50 feet) are comprised of multiple tube sections 14. In the embodiment shown in FIG. 1, the boom 12 comprises three tube sections 14, each section being approximately 40 feet to 50 feet in length. Adjacent tube sections are preferably slidably connected together, end-to-end.

Figure 4:
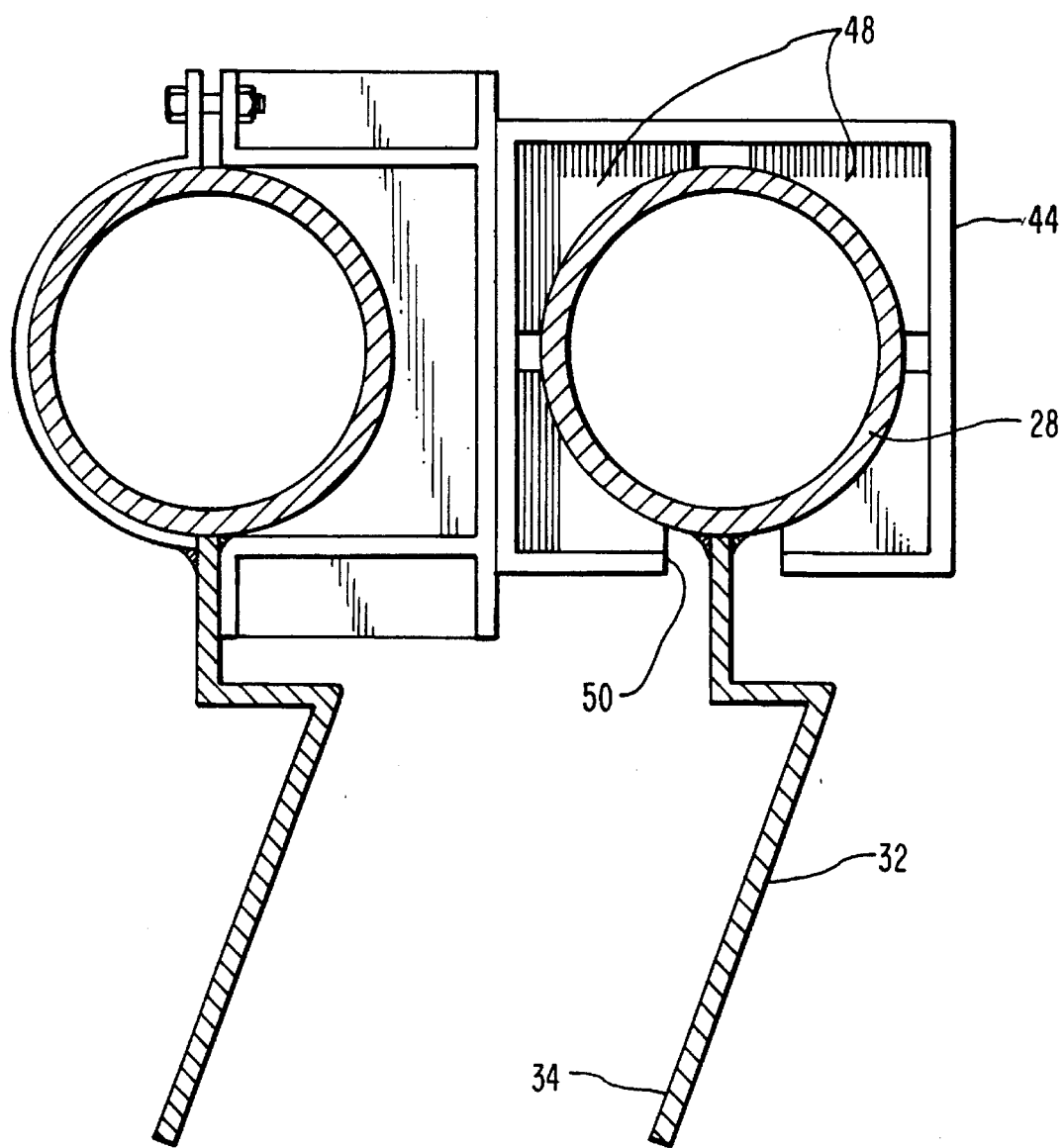
FIG. 4 is a cross-sectional view taken along line 4—4 of FIG. 1.

Several different methods are available for attaching a plurality of tube sections 14 together. For instance, the tube sections can be joined end-to-end either permanently or removably. The adjacent tube sections can be rigidly joined or joined at a movable or flexible joint. One method of attaching multiple tube sections 14 together is illustrated in FIGS. 3 and 4. As shown in these FIGS., adjacent tube sections 14 are slidably connected, such that one tube section 14 moves in a longitudinal direction relative to the other tube section 14. In the illustrated embodiment, one tube section, designated 14A, is slidably located within a sleeve housing 44 securely affixed to the adjacent tube section, designated 14B with a pair of brackets 46.

A plurality of bushings 48 line the interior of sleeve housing 44 for the purpose of guiding the movement of tube section 14A and for reducing friction caused by the sliding movement. The bushings are preferably constructed of a smooth, yet resilient polymeric material.

As shown best in FIG. 4, the sleeve housing 44 preferably includes an opening to permit slidable movement of tube sections 14 containing a skirt 32.

Another means for attaching tube sections 14 in an end-to-end fashion, as depicted in FIG. 7, utilizes a piano-type hinge 54 similar to hinges used on conventional doors. The piano-type hinge 54 comprises two opposing hinge plates 56 joined at one end by a fixed pin 58. Each of the opposing hinge plates 56 is affixed to one end of tube section 14. At the edge of each hinge plate 56 opposite the edge containing the fixed pin 58 are two bolt holes 60, one at the upper edge of the hinge plate (shown, 60), and one at the lower edge of the hinge plate (not shown). The upper and lower bolt holes 60 of each hinge plate 56 correspond with the upper and lower bolt holes 60 of the opposing hinge plate 56 such that the opposing plates 56 may be connected by means of a pair of connecting bolts 62 (only the top connecting bolt is shown).

Figure 5:
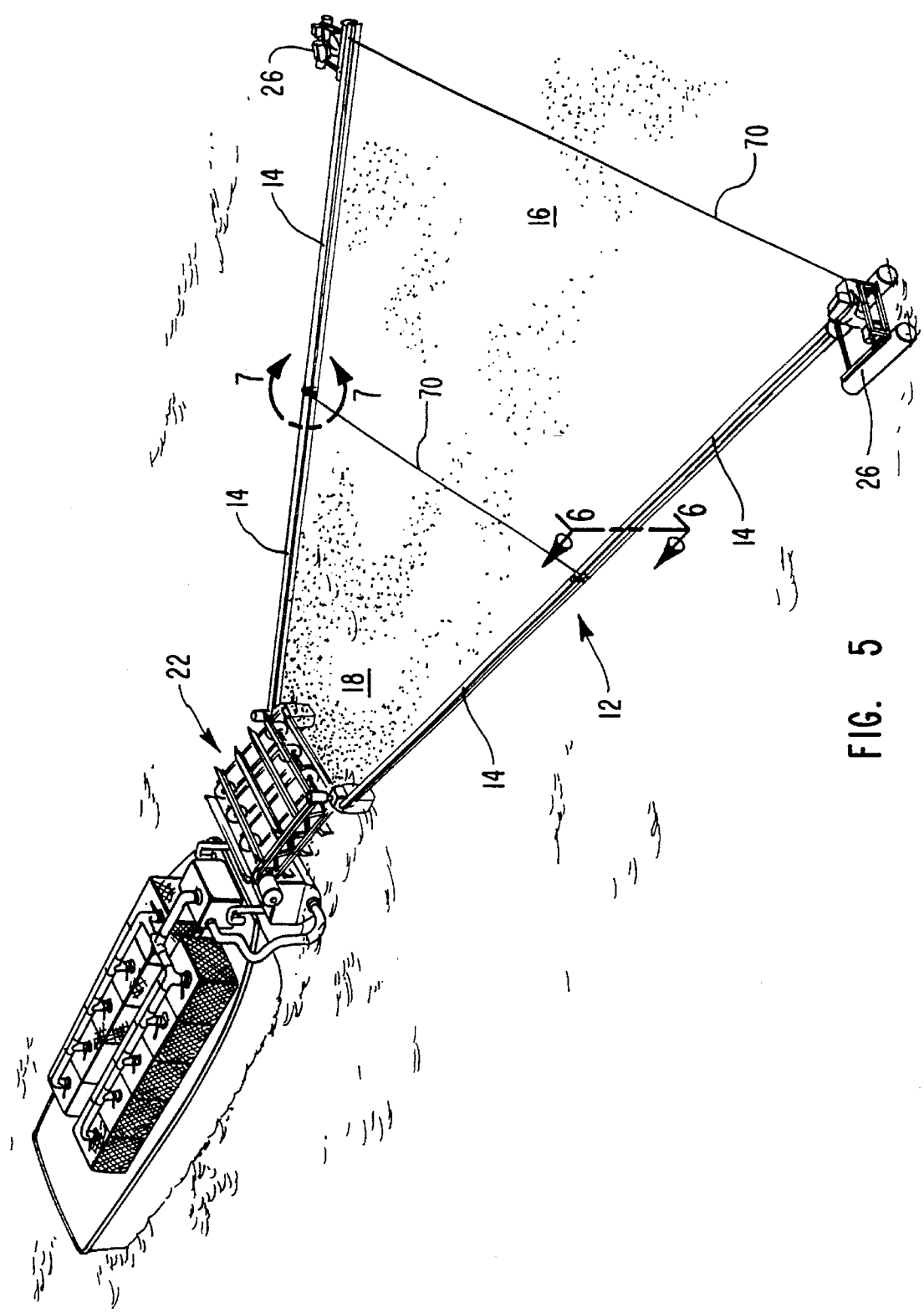
FIG. 5 is an elevated perspective view of an alternative floatable boom embodiment in operation at a water surface.

When the connecting bolts 62 are affixed, the adjacent tube sections 14, form a single, rigid boom 12, such as that depicted in FIG. 5. When the connecting bolts 62 are removed, the hinge plates 56 are free to rotate about the axis formed by the fixed pin 58, as depicted in FIG. 7. This allows adjacent tube sections to fold back on each other, thus facilitating transport and storage of the floatable booms 12.

FIG. 7 also depicts one method in which adjacent sections of skirt 32 may be connected. In the depicted embodiment, adjacent sections of skirt 32 are connected by a durable, flexible material impermeable to brine shrimp eggs, such as a sheet of neoprene rubber 64. One skilled in the art will appreciate that this sheet of neoprene rubber 64 may be connected to adjacent sections of skirt 32 in a variety of ways. One could, for example, glue the sheet of neoprene rubber to adjacent sections of skirt 32 or, alternatively, could fasten it with a series of rivets (not shown).

The sheet of neoprene rubber 64 serves to provide the skirt 32 with a continuous nature, such that there are no gaps between adjacent sections of skirt 32 which would permit brine shrimp eggs 20 to escape beneath the floatable tube sections 14. In addition, the flexible nature of the neoprene rubber 64 allows the floatable boom 12 to be folded back on itself by means of the piano hinge 54, as described previously and depicted in FIG. 7.

The present invention optionally includes support means for maintaining the wedge-shaped, concentrating angle between two floatable booms 12. The support means may be comprised of a variety of different structures such as, for example, a rigid bar or strut, a rope, or a chain. It is presently preferred, however, that the support means comprise a cable 70. In some cases, it may be useful to use two cables 70 as support means, as shown in FIG. 5, with one cable 70 located approximately midway along the length of the boom 12, near the connecting point (e.g. a piano hinge 54) of the individual floatable tube sections 14, and the second cable 70 located near the forward end 16 of the boom 12.

Each of the support cables 70 is preferably connected to the booms 12 in a detachable fashion. The detachable nature of the support cables 70 allows one to readily detach the cables 70 when disconnecting the individual tube sections 14, or folding the floatable boom 12 back onto itself, as in preparation for transport.

One method of detachably connecting the support cable 70 to the boom 12 is depicted in FIGS. 6 and 7. In this embodiment, an eye-bolt 72 and turnbuckle 74 are utilized to connect the support cable 70 to the inner surface of the skirt 32. A simple bracket 76 passes through the eye of the eye-bolt 72 and is attached to the inner surface of the skirt 32 by a series of screws 78. The eye-bolt 72 threadably engages the one end of turnbuckle 74, while the other end of the turnbuckle 74 is affixed to the support cable 70. The support cable 70 can be readily attached to, or detached from, the skirt 32 by screwing the turnbuckle 74 onto, or unscrewing it from the eye-bolt 72.

As an alternative, related method of attachment (not shown), the eye of the eye-bolt 72 could be replaced by a hook. The hook could then readily engage the simple bracket 76 in a detachable manner. In this embodiment, there would be no need to screw the turnbuckle 74 onto the eye-bolt 72 each time the support cable 70 was connected to the skirt 32, or unscrew it when it was disconnected. Instead, the hook would be hooked to, or unhooked from, the bracket 76.

Figure 8:
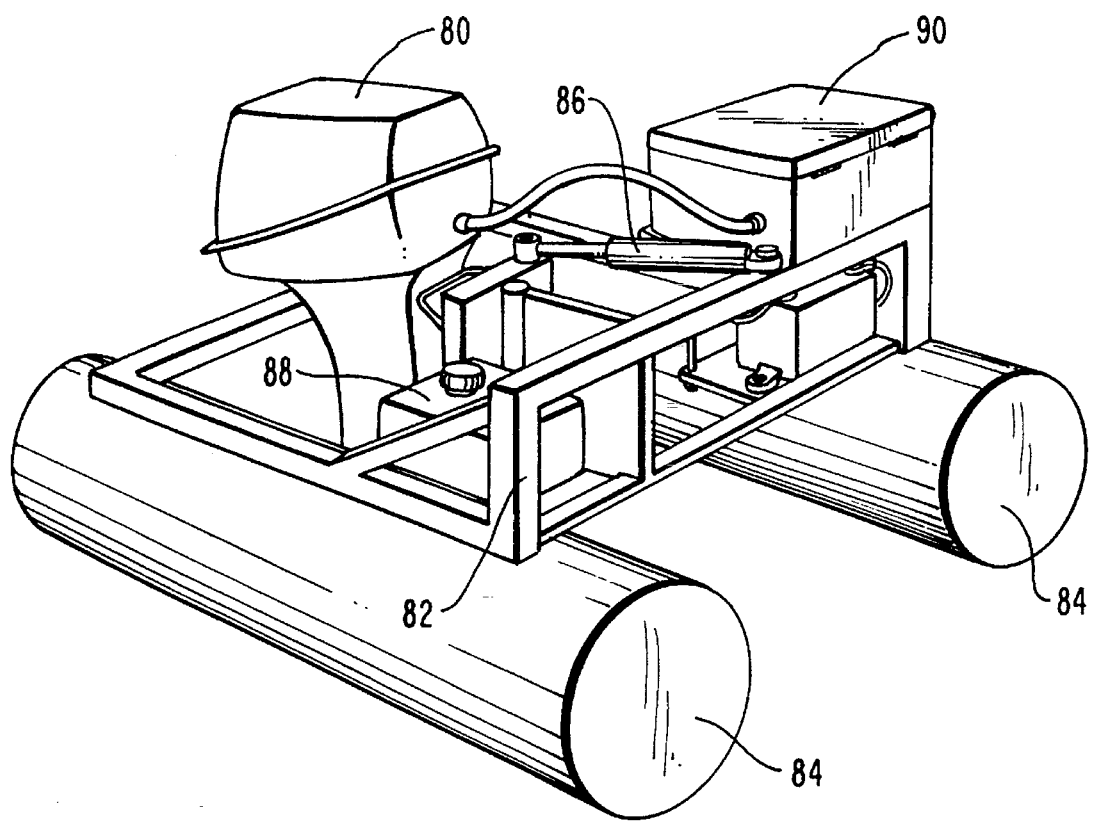
FIG. 8 is a perspective view of a drive device within the scope of the present invention.

A drive device 26 is preferably attached to the forward end 16 of each of the floatable booms 12. The drive device 26 serves to propel the floatable boom 12 through the water and, in its presently preferred embodiment, is remotely controlled. FIG. 8 depicts one embodiment of a drive device 26. The drive device 26 comprises an outboard motor 80 attached to a frame 82, a pair of pontoon-like floats 84 attached to the frame 82, and a hydraulic or electric ram 86 for steering the motor 80 remotely. In addition, the drive device 26 comprises a fuel container 88 to supply the outboard motor 80 with fuel.

There are various means for operating the motor 80 remotely. One preferred embodiment utilizes a control box 90 which may be affixed to the frame 82 (shown) or, alternatively, to the floats 84. The control box 90 should comprise a means for adjusting the ignition, the throttle, and means for shifting the motor between neutral, forward, and reverse of the outboard motor 80. The control box also preferably controls the operation of ram 86.

In one embodiment of the present invention, the control box 90 is controlled remotely through a series of control cables 92. The control cables 92 extend from the harvesting boat 10 to the drive device 26 and are contained within a conduit 94 which is affixed to the upper portion of the floating tube section 14. The conduit 94 can be affixed to the upper portion of the floating tube section 14 by the same ring shaped brackets 36 which encircle the tube section 14 and hold the skirt 32 in position. The control cables 92 may be any type of cable capable of transmitting control signals to the control box 90. Fiber optic cables and electric cables are two examples of different types of control cables 92 which may be employed.

Alternatively, the drive device 26 may be controlled remotely by radio wave communication. In this embodiment, the control box 90 of the drive device 26 is equipped with means for receiving radio signals and, naturally, control cables 92 extending from the harvesting boat 10 to the drive device 26 would not be needed. Because control cables 92 are not required when radio wave communication is utilized, the conduit 94 affixed to the floatable tube section 14, depicted in FIGS. 6 and 7, may likewise be omitted.

From the foregoing, it should be appreciated that the present invention provides a floatable boom that is significantly longer than conventional straight-arm booms. In addition, the floatable boom of the present invention is capable of being independently directed to a shifting target of floating shrimp eggs in a simple, convenient manner that does not require removing the boom from the water and replacing it. Further, the present invention provides a floatable boom which can be controlled remotely, such as, for example, from the harvesting boat.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A floatable boom for use in concentrating a thin layer of brine shrimp eggs at the surface of a body of water for the purpose of harvesting said brine shrimp eggs comprising:

a rigid, floatable tube having an upper portion designed to float above the body of water surface and a lower portion designed to submerge below the body of water surface, said tube having first and second ends, wherein said floatable tube is substantially rigid in a linear direction between said first and second ends;

a rigid skirt affixed to the lower portion of the tube and extending into the body of water, said skirt being angled such that said skirt does not extend substantially vertically downward, and having first and second ends;

means for attaching the first end of the tube and skirt to a brine shrimp harvesting boat such that the tube and skirt extend outwardly from the boat; and means for attaching the second end of the tube and skirt to a drive device for propelling the floatable boom through the body of water.

2. The apparatus as set forth in claim 1, wherein the rigid floatable tube comprises multiple sections of rigid tube and skirt each connected together, wherein said multiple sections of rigid tube and skirt connected together are substantially rigid in a linear direction.

3. The apparatus as set forth in claim 1, wherein the tube is a plastic pipe filled with foam.

4. The apparatus as set forth in claim 1, wherein the tube is an aluminum pipe.

5. The apparatus as set forth in claim 1, wherein the tube has a diameter in the range from about 4 inches to about 12 inches.

6. The apparatus as set forth in claim 1, wherein the tube has a length of from about 20 feet to about 200 feet.

7. The apparatus as set forth in claim 1, wherein the tube has a length of from about 40 feet to about 150 feet.

8. The apparatus as set forth in claim 1, wherein the tube has a length of from about 80 feet to 135 feet.

9. The apparatus as set forth in claim 1, wherein the skirt is aluminum.

10. The apparatus as set forth in claim 1, wherein the skirt has a depth from the water surface in the range from about 4 inches to about 18 inches.

11. The apparatus as set forth in claim 1, wherein the drive device is a boat.

12. The apparatus as set forth in claim 1, wherein the drive device is an unmanned boat.

13. A floatable boom for use in concentrating a thin layer of brine shrimp eggs at the surface of a body of water for the purpose of harvesting said brine shrimp eggs comprising:

a rigid floatable tube having an upper portion designed to float above the body of water surface and a lower portion designed to submerge below the body of water surface, said tube having first and second ends, wherein said floatable tube is substantially rigid in a linear direction between said first and second ends;

a skirt affixed to the lower portion of the tube and extending into the body of water, said skirt having first and second ends;

means for attaching the first end of the tube and skirt to a brine shrimp harvesting boat such that the tube and skirt extend outwardly from the boat; and means for attaching the second end of the tube and skirt to an unmanned drive device for propelling the floatable boom through the body of water, said drive device being remotely controlled.

14. The apparatus as set forth in claim 13, wherein the remotely controlled drive device comprises:

a frame;

at least one float attached to the frame;

an outboard motor attached to the frame; and means for operating the motor remotely.

15. The apparatus as set forth in claim 13, wherein the drive device is radio controlled.

16. The apparatus as set forth in claim 13, wherein the apparatus further comprises a conduit affixed to the upper portion of the tube, said conduit containing therein control cables for controlling the drive device.

17. The apparatus as set forth in claim 16, wherein the control cables comprise fiber optic cables.

18. The apparatus as set forth in claim 16, wherein the control cables comprise electric cables.

19. The apparatus as set forth in claim 13, wherein the skirt is rigid.

20. The apparatus as set forth in claim 19, wherein the skirt is angled such that said skirt does not extend substantially vertically downward.

21. The apparatus as set forth in claim 13, wherein the rigid floatable tube comprises multiple sections of rigid tube and skirt each connected together, wherein said multiple sections of rigid tube and skirt connected together are substantially rigid in a linear direction.

22. An apparatus for use in concentrating a thin layer of brine shrimp eggs at the surface of a body of water for the purpose of harvesting said brine shrimp eggs comprising:

at least two floatable booms forming a wedge-shaped, concentrating angle defining a wide forward end of said concentrating angle and a narrow rearward end, said floatable booms having a length of about 40 feet to about 150 feet, wherein each floatable boom comprises:

a plurality of rigid, floatable tube sections having a lower portion designed to submerge below the body of water surface, wherein adjacent tube sections are slidably connected to form each floatable boom, and wherein the tube sections have a diameter in the range from about 4 inches to about 12 inches; and a rigid skirt affixed to the lower portion of each tube section and extending into the body of water;

means for attaching the floatable booms to a brine shrimp harvesting boat such that the floatable booms extend outwardly from the boat; and means for attaching the floatable booms to a remotely controlled drive device for propelling the floatable booms through the body of water, wherein the remotely controlled drive device comprises a frame having at least one float attached to the frame and an outboard motor attached to the frame, and means for operating the motor remotely.

23. The apparatus as set forth in claim 22, wherein the floatable booms have a length of about 80 feet to about 135 feet.

24. The apparatus as set forth in claim 22, wherein the tube sections include plastic pipe filled with foam.

25. The apparatus as set forth in claim 22, wherein the tube sections include aluminum pipe.

26. The apparatus as set forth in claim 22, wherein the skirt is angled such that said skirt does not extend substantially vertically downward.

27. The apparatus as set forth in claim 22, wherein the skirt is aluminum.

28. The apparatus as set forth in claim 22, wherein the skirt has a depth from the water surface in the range from about 4 inches to about 18 inches.

29. The apparatus as set forth in claim 22, wherein the drive device is radio controlled.

30. The apparatus as set forth in claim 22, wherein the apparatus further comprises a conduit affixed to the upper portion of the tube sections, said conduit containing therein control cables for controlling the drive device.

31. The apparatus as set forth in claim 30, wherein the control cables comprise fiber optic cables.

32. The apparatus as set forth in claim 30, wherein the control cables comprise electric cables.

33. The apparatus as set forth in claim 22, further comprising at least one support means for maintaining the concentrating angle between the booms.

34. The apparatus as set forth in claim 33, wherein the at least one support means comprises a cable.

* * * * *